United States Patent
Wang et al.

(10) Patent No.: US 11,223,399 B2
(45) Date of Patent: Jan. 11, 2022

(54) BASE STATION AND MODULATION METHOD SUPPORTING LATTICE-PARTITION-BASED NON-ORTHOGONAL MULTIPLE ACCESS

(71) Applicant: National Tsing Hua University, Hsinchu (TW)

(72) Inventors: Chin-Liang Wang, Hsinchu (TW); Ting-Han Liou, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 17/024,711

(22) Filed: Sep. 18, 2020

(65) Prior Publication Data

US 2021/0320695 A1 Oct. 14, 2021

(30) Foreign Application Priority Data

Apr. 9, 2020 (TW) ................................. 109111918

(51) Int. Cl.
*H04B 7/02* (2018.01)
*H04B 7/0456* (2017.01)
(Continued)

(52) U.S. Cl.
CPC ......... *H04B 7/0465* (2013.01); *H04B 1/7103* (2013.01); *H04B 7/0623* (2013.01);
(Continued)

(58) Field of Classification Search
CPC .. H04B 7/0465; H04B 1/7103; H04B 7/0623; H04B 7/0628; H04W 52/143; H04W 52/322
(Continued)

(56) References Cited

U.S. PATENT DOCUMENTS

2012/0322447 A1* 12/2012 Ramachandran ..... H04W 48/18
455/436
2020/0336158 A1* 10/2020 Uesaka ............. H04W 72/0446
(Continued)

FOREIGN PATENT DOCUMENTS

| CN | 107241922 | 10/2017 |
|---|---|---|
| TW | 201204133 | 1/2012 |
| WO | 2018203662 | 11/2018 |

OTHER PUBLICATIONS

Chin-Liang Wang, et al., "Improved Modulation Schemes for Lattice-Partition-Based Downlink Non-Orthogonal Multiple Access Systems" IEEE Wireless Communications Letters ( Early Access ), Aug. 6, 2020, pp. 1-5.

(Continued)

*Primary Examiner* — Don N Vo
(74) *Attorney, Agent, or Firm* — JCIPRNET

(57) ABSTRACT

The invention discloses a base station and a modulation method supporting lattice-partition-based downlink non-orthogonal multiple access. The modulation method includes: modulating at least one most significant bit (MSB) of weak user equipment (UE) into a first signal with first transmission power; modulating at least one least significant bit (LSB) of the weak UE into a second signal with second transmission power, where the second transmission power is less than the first transmission power; and modulating at least one second MSB of strong UE into a third signal with third transmission power, where the third transmission power is between the first transmission power and the second transmission power.

16 Claims, 8 Drawing Sheets

(51) Int. Cl.
*H04B 1/7103* (2011.01)
*H04W 52/32* (2009.01)
*H04B 7/06* (2006.01)
*H04W 52/14* (2009.01)

(52) U.S. Cl.
CPC ........ *H04B 7/0628* (2013.01); *H04W 52/143* (2013.01); *H04W 52/322* (2013.01)

(58) Field of Classification Search
USPC ....................................................... 375/267
See application file for complete search history.

(56) References Cited

U.S. PATENT DOCUMENTS

2021/0083911 A1* 3/2021 Morozov .............. H04L 27/261
2021/0100012 A1* 4/2021 Miao .................. H04W 72/044

OTHER PUBLICATIONS

Shin-Lin Shieh, et al., "A Simple Scheme for Realizing the Promised Gains of Downlink Nonorthogonal Multiple Access", IEEE Transactions on Communications ( vol. 64 , Issue: 4 , Apr. 2016 ), Feb. 24, 2016, pp. 1624-1635.
Min Qiu, et al., "Lattice-Partition-Based Downlink Non-Orthogonal Multiple Access Without SIC for Slow Fading Channels" IEEE Transactions on Communications ( vol. 67 , Issue: 2 , Feb. 2019 ), Oct. 31, 2018. pp. 1166-1181.
"Office Action of Taiwan Counterpart Application", dated Jan. 7, 2021, p. 1-p. 4.

* cited by examiner

BASE STATION AND MODULATION METHOD SUPPORTING LATTICE-PARTITION-BASED NON-ORTHOGONAL MULTIPLE ACCESS

CROSS-REFERENCE TO RELATED APPLICATION

This application claims the priority benefit of Taiwan application serial no. 109111918, filed on Apr. 9, 2020. The entirety of the above-mentioned patent application is hereby incorporated by reference herein and made a part of this specification.

BACKGROUND OF THE INVENTION

1. Field of the Invention

The invention relates to an electronic device and a method, and in particular, to a base station and a modulation method supporting lattice-partition (LP)-based downlink non-orthogonal multiple access (NOMA).

2. Description of Related Art

Most existing wireless communication systems adopt orthogonal multiple access (OMA) techniques, which may perform user multiplexing orthogonally in a time domain, a frequency domain, or a code domain to avoid inter-user interference.

With the continuous growth of mobile devices and network activities, the amount of data and the corresponding transmission rates required for wireless communications are getting higher. In order to meet such stringent transmission requirements, NOMA has been considered a promising solution for future wireless communications. As compared with OMA, NOMA allows multiple users to share the same channel resources, and can provide higher system capacity or sum capacity. Specifically, in a downlink power-domain NOMA system, message signals intended for different pieces of user equipment (UE) are superposed in the power domain at the base station for transmission on the same frequency band at the same time slot. For such a NOMA system, the message signals for different pieces of UE would interfere with each other, and successive interference cancellation (SIC) is often applied at UE receivers before detection of the desired message signals.

The theoretical capacity region of a downlink power-domain NOMA system can be achieved by employing continuous Gaussian input signals at the base station and using SIC at the UE receivers. However, using continuous Gaussian input signals at the base station is impractical, and using SIC also increases the decoding complexity and delay on the UE receivers.

In recent years, there has been a growing interest in investigating lattice-partition-based (LP-based) NOMA in which NOMA transmission is performed with practical discrete input signals at the base station and without using SIC at the UE receivers. Since LP-based NOMA involves lower decoding complexity and delay on the UE receivers, it is important to develop techniques for improving sum capacity performance of an LP-based NOMA system.

SUMMARY OF THE INVENTION

The invention is directed to a base station and a modulation method supporting lattice partition (LP)-based downlink non-orthogonal multiple access (NOMA), through which the sum capacity performance of an LP-based NOMA system is improved.

A base station supporting LP-based downlink NOMA provided by the invention is configured to communicate with strong user equipment (UE) (i.e., UE with a high channel gain) and weak UE (i.e., UE with a low channel gain), where the base station includes a processor and a transceiver. The processor is coupled to the transceiver, and is configured to modulate at least one most significant bit (MSB) of the weak UE into a first signal with first transmission power. The processor modulates at least one least significant bit (LSB) of the weak UE into a second signal with second transmission power, where the second transmission power is less than the first transmission power. The processor modulates at least one second MSB of the strong UE into a third signal with third transmission power, where the third transmission power is between the first transmission power and the second transmission power.

In an embodiment of the invention, the processor is further configured to determine the third transmission power according to the number of the at least one LSB.

In an embodiment of the invention, the processor is further configured to determine the first transmission power according to the number of the at least one second MSB.

In an embodiment of the invention, the processor is further configured to modulate at least one second LSB of the strong UE into a fourth signal with fourth transmission power, where the fourth transmission power is less than the third transmission power.

In an embodiment of the invention, the fourth transmission power is less than the second transmission power.

In an embodiment of the invention, the processor is further configured to determine the second transmission power according to the number of the at least one second LSB.

In an embodiment of the invention, the fourth transmission power is greater than the second transmission power.

In an embodiment of the invention, the processor is further configured to determine the fourth transmission power according to the number of the at least one LSB.

A modulation method for communicating with strong UE and weak UE provided by the invention is applied to a base station supporting LP-based downlink NOMA. The modulation method includes the following steps. At least one MSB of the weak UE is modulated into a first signal with first transmission power. At least one LSB of the weak UE is modulated into a second signal with second transmission power, where the second transmission power is less than the first transmission power. At least one second MSB of the strong UE is modulated into a third signal with third transmission power, where the third transmission power is between the first transmission power and the second transmission power.

In an embodiment of the invention, the step of modulating the at least one second MSB of the strong UE into the third signal with the third transmission power includes the following step. The third transmission power is determined according to the number of the at least one LSB.

In an embodiment of the invention, the step of modulating the at least one MSB of the weak UE into the first signal with the first transmission power includes the following step. The first transmission power is determined according to the number of the at least one second MSB.

In an embodiment of the invention, the modulation method further includes the following step. At least one second LSB of the strong UE is modulated into a fourth signal with fourth transmission power, where the fourth transmission power is less than the third transmission power.

In an embodiment of the invention, the fourth transmission power is less than the second transmission power.

In an embodiment of the invention, the step of modulating the at least one LSB of the weak UE into the second signal with the second transmission power includes the following step. The second transmission power is determined according to the number of the at least one second LSB.

In an embodiment of the invention, the fourth transmission power is greater than the second transmission power.

In an embodiment of the invention, the step of modulating the at least one second LSB of the strong UE into the fourth signal with fourth transmission power includes the following step. The fourth transmission power is determined according to the number of the at least one LSB.

Based on the above, the base station and the modulation method supporting LP-based downlink NOMA provided by the invention may be used to increase a sum capacity of an LP-based downlink NOMA system. The base station may distribute transmission power to a plurality of bits of the strong UE and a plurality of bits of the weak UE, so that all the bits of the strong UE obtain a higher sum of transmission power than all the bits of the weak UE. In this way, a greater sum capacity compared to that of a conventional LP-based downlink NOMA system is provided.

DESCRIPTION OF THE EMBODIMENTS

Figure 1:
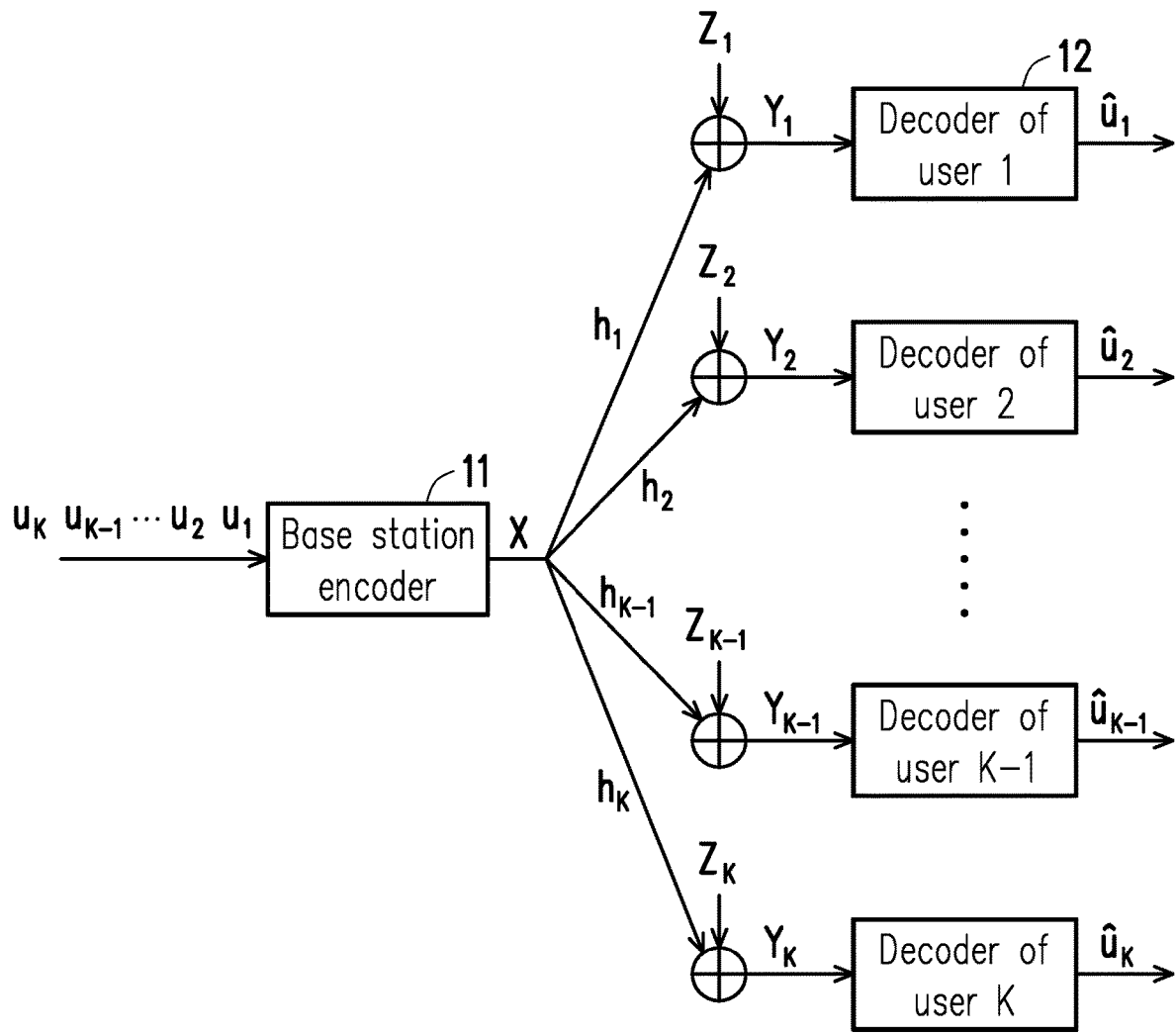
FIG. 1 is a schematic diagram illustrating a lattice partition (LP)-based non-orthogonal multiple access (NOMA) modulation architecture according to an embodiment of the invention.

In order to make the content of the invention understood more easily, embodiments are provided below as examples based on which the invention can be implemented. In addition, where possible, elements/components/steps with the same labels in the drawings and implementations represent the same or similar parts.

FIG. 1 is a schematic diagram illustrating a lattice partition (LP)-based non-orthogonal multiple access (NOMA) modulation architecture 10 according to an embodiment of the invention. The modulation architecture 10 may include a base station encoder 11 and a plurality of decoders corresponding to a plurality of users (i.e., users 1-K, where K is a positive integer) respectively, where the plurality of decoders may include a decoder 12 of a user 1. User messages $u_i$ (i=1, 2, ..., K-1, K) are user messages corresponding to a plurality of pieces of user equipment (UE) i (i=1, 2, ..., K-1, K), where K is an arbitrary positive integer and transmission channels used by the user messages $u_i$ (i=1, 2, ..., K-1, K) with smaller i values have greater channel gains. The base station encoder 11 may superpose the user messages $u_i$ (i=1, 2, ..., K-1, K) of the plurality of pieces of UE into a single superposed signal X, and transmit the superposed signal X to the plurality of pieces of UE i (i=1, 2, ..., K-1, K) through a plurality of channels $h_i$ (i=1, 2, ..., K-1, K) respectively. A received signal $Y_i$ (i=1, 2, ..., K-1, K) received by each of the plurality of pieces of UE i (i=1, 2, ..., K-1, K) includes noise $Z_i$ (i=1, 2, ..., K-1, K). By taking user equipment (UE) 1 corresponding to the user message $u_1$ as an example, a user decoder 12 of the UE 1 may process the received signal $Y_1$ with an appropriate detection/decoding method to reconstruct the user message $u_1$, thus generating a reconstructed user message $\hat{u}_1$. Based on the same manner, a user decoder of UE i (i=2, ..., K-1, K) may process a received signal $Y_i$ (i=2, ..., K-1, K) with an appropriate detection/decoding method to reconstruct a user message $u_i$ (i=2, ..., K-1, K), thus generating a reconstructed user message $\hat{u}_i$ (i=2, ..., K-1, K).

Assuming that a received signal-to-noise ratio (SNR) corresponding to the UE i (i=1, 2, ..., K-1, K) is $SNR_i$ (i=1, 2, ..., K-1, K), the maximum number $n_i$ (i=1, 2, ..., K-1, K) of bits above a noise level in the user message $u_i$ (i=1, 2, ..., K-1, K) may be shown as follows:

$$n_i = \lceil (1/2) \cdot \log_2(SNR_i) \rceil. \quad (1)$$

Assuming that the number of transmission bits corresponding to the UE i (i=1, 2, ..., K-1, K) is $m_i$ (i=1, 2, ..., K-1, K), in order to ensure correct data transmission, $m_i$ (i=1, 2, ..., K-1, K) may be configured to meet the following constraints as in equation (2):

$$\begin{cases} m_1 + m_2 + \ldots + m_K \leq n_1 \\ m_2 + \ldots + m_K \leq n_2 \\ \ldots \\ m_K \leq n_K. \end{cases} \quad (2)$$

A lattice $\Lambda$ is defined as a discrete set of points in a Euclidean space, which is closed under addition and reflection. With the lattice $\Lambda$, a lattice partition chain that can be expressed as $$\Lambda / 2^{m_1} \Lambda / 2^{m_1+m_2} \Lambda / \ldots / 2^{\sum_{i=1}^{K} m_i} \Lambda$$

may be established, and the user messages $u_i$ (i=1, 2, ..., K-1, K) may be modulated or mapped onto appropriate signal constellation sets based on the lattice partition chain. The modulated signals for all the user messages are then superposed together, thereby generating a superposed signal X (i.e., transmission signal) corresponding to the LP-based NOMA system shown as follows:

$$X = [X_1 + X_2 + \ldots + X_K] \bmod \Lambda_S = \quad (3)$$
$$\beta([V_1 + 2^{m_1} V_2 + \ldots + 2^{m_1+m_2+\ldots+m_{K-1}} V_K] \bmod \Lambda_S)$$

where $m_i$ (i=1, 2, ..., K−1, K) needs to meet the constraints as shown in equation (2), $$\Lambda_S \triangleq 2^{\Sigma_{i=1}^{K} m_i} \Lambda,$$

β is a scaling factor for adjusting the magnitude (or power) of the transmission signal X, $V_i$ (i=1, 2, ..., K−1, K) is a modulated signal corresponding to the user message $u_i$ (i=1, 2, ..., K−1, K), that is, $V_i$ is one of corresponding $2^{m_i}$ constellation points for modulation, and $$X_i = \beta \cdot 2^{\sum_{j=1}^{i} m_{j-1}} \cdot V_i (i = 1, 2, \ldots, K-1, K)$$

is a transmission signal corresponding to the user message $u_i$, where $m_0$=0.

Assuming that an average power of the modulated signal $V_i$ of the user message $u_i$ (i=1, 2, ..., K−1, K) is $P_i$, the power of the corresponding transmission signal $X_i$ (i=1, 2, ..., K−1, K) is configured as $$\left(\beta \cdot 2^{\sum_{j=1}^{i} m_{j-1}}\right)^2 \cdot P_i,$$

where $m_0$=0. The average power $P_i$ (i=1, 2, ..., K−1, K) can be equal or different, and this disclosure is not limited in this respect. For convenience of descriptions, the values of $P_i$ (i=1, 2, ..., K−1, K) are all set to be 1 in all embodiments.

Figure 2:
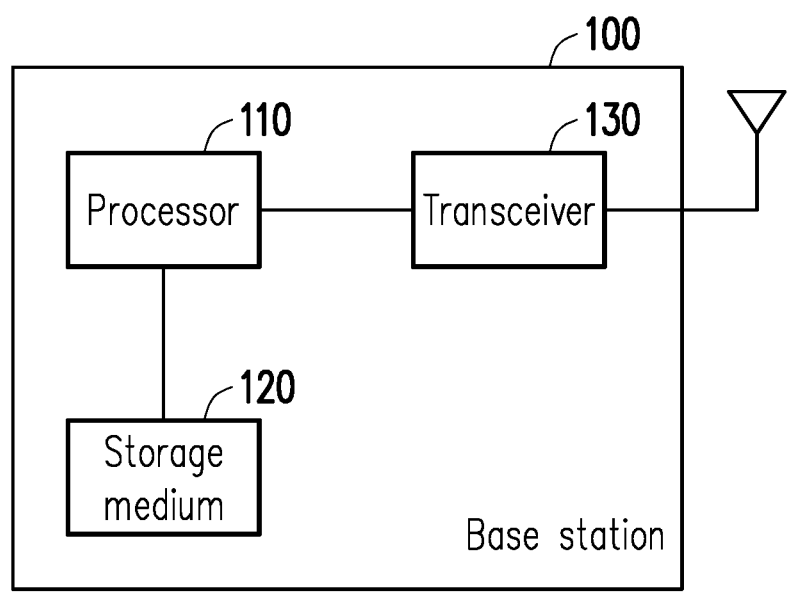
FIG. 2 is a schematic diagram illustrating a base station supporting LP-based NOMA according to an embodiment of the invention.

FIG. 2 is a schematic diagram illustrating a base station 100 supporting LP-based NOMA according to an embodiment of the invention, where the base station 100 may be configured to communicate with strong UE and weak UE. The base station 100 may include a processor 110, a storage medium 120, and a transceiver 130.

The processor 110 is, for example, a central processing unit (CPU), or another programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA) or other similar elements, or a combination thereof. The processor 110 may be coupled to the storage medium 120 and the transceiver 130 to access and execute a plurality of modules and various applications stored in the storage medium 120.

The storage medium 120 is, for example, any type of fixed or removable random access memory (RAM), a read-only memory (ROM), a flash memory, a hard disk drive (HDD), a solid state drive (SSD) or similar elements, or a combination thereof, and is configured to store the plurality of modules or various applications executable by the processor 110.

The transceiver 130 transmits and receives signals in a wirelessly or wired manner. The transceiver 130 may also perform, for example, low noise amplification, impedance matching, frequency mixing, frequency up- or down-conversion, filtering, amplification, and similar operations.

Figure 3:
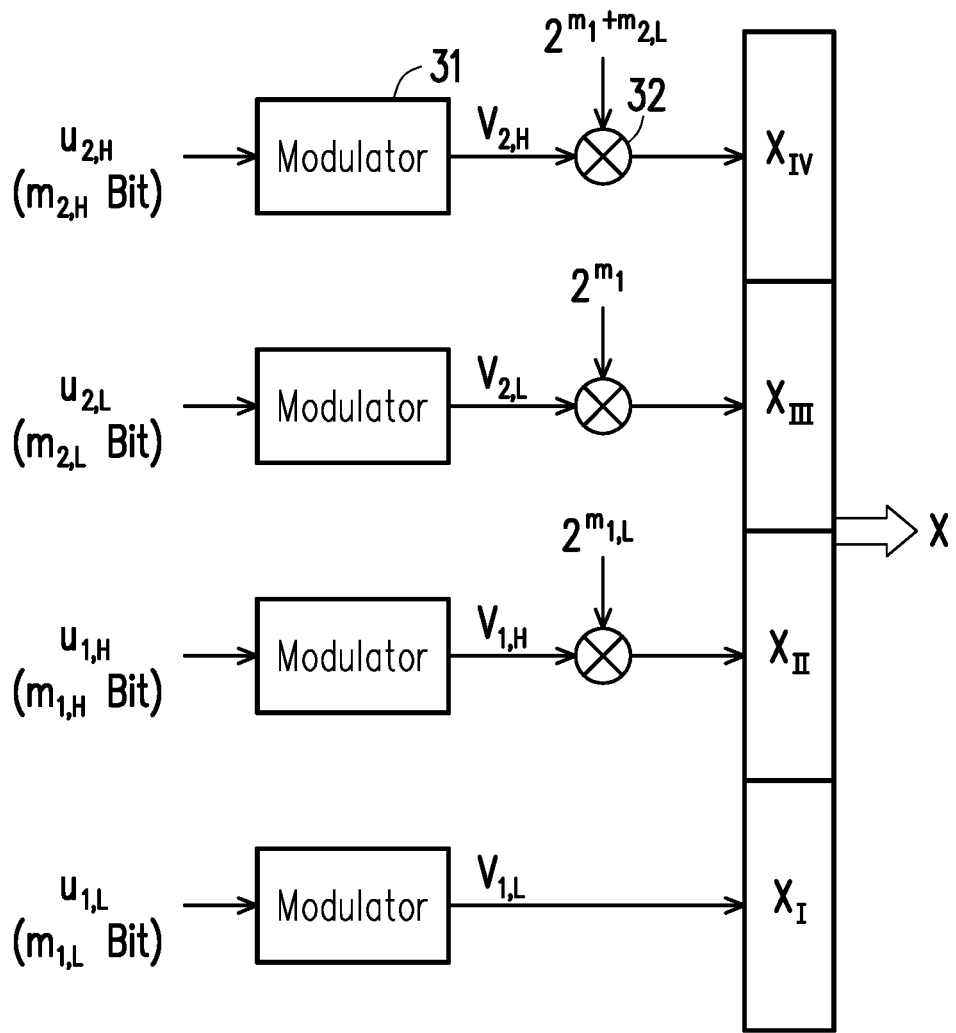
FIG. 3 is a schematic diagram illustrating an LP-based downlink NOMA modulation architecture according to a first embodiment of the invention.

FIG. 3 is a schematic diagram illustrating an LP-based downlink NOMA modulation architecture 30 according to a first embodiment of the invention. The modulation architecture 30 may include a plurality of modulators and a plurality of power distribution circuits, where the plurality of modulators may include a modulator 31 (e.g., but not limited to, a pulse amplitude modulation (PAM) modulator or a quadrature amplitude modulation (QAM) modulator), and the plurality of power distribution circuits may include a power distribution circuit 32 (e.g., a multiplier). The modulation architecture 30 may be implemented by the transceiver 130 of the base station 100 as shown in FIG. 2. For example, the transceiver 130 may include the plurality of modulators including the modulator 31 and the plurality of power distribution circuits including the power distribution circuit 32, where the modulator 31 is coupled to the power distribution circuit 32, and the plurality of modulators and the plurality of power distribution circuits may be coupled to the processor 110 respectively.

In the present embodiment, a user message $u_{1,H}$ corresponds to at least one most significant bit (MSB) of the strong UE, a user message $u_{1,L}$ corresponds to at least one least significant bit (LSB) of the strong UE, $m_1$ ($m_1=m_{1,H}+m_{1,L}$) is the number corresponding to transmission bits of the strong UE, $m_{1,H}$ is the number corresponding to the at least one MSB of the strong UE, $m_{1,L}$ is the number corresponding to the at least one LSB of the strong UE, a user message $u_{2,H}$ corresponds to at least one MSB of the weak UE, a user message $u_{2,L}$ corresponds to at least one LSB of the weak UE, $m_2$ ($m_2=m_{2,H}+m_{2,L}$) is the number corresponding to transmission bits of the weak UE, $m_{2,H}$ is the number corresponding to the at least one MSB of the weak UE, and $m_{2,L}$ is the number corresponding to the at least one LSB of the weak UE.

The processor 110 may distribute power to the transmission bits of the strong UE and the weak UE. For example, after the transceiver 130 modulates the user message $u_{2,H}$ into a signal $V_{2,H}$ through the modulator 31, the processor 110 may control the power distribution circuit 32 to allocate the signal $V_{2,H}$ transmission power $(\beta \cdot 2^{m_1+m_{2,L}})^2$, thus generating a signal $X_{IV}$ corresponding to the user message $u_{2,H}$.

Similarly, after the transceiver 130 modulates the user message $u_{2,L}$ into a signal $V_{2,L}$ through the modulator, the processor 110 may control the power distribution circuit to allocate the signal $V_{2,L}$ transmission power $(\beta \cdot 2^{m_1})^2$, thus generating a signal $X_{III}$ corresponding to the user message $u_{2,L}$, where the transmission power $(\beta \cdot 2^{m_1})^2$ is less than the transmission power $(\beta \cdot 2^{m_1+m_{2,L}})^2$.

Similarly, after the transceiver 130 modulates the user message $u_{1,H}$ into a signal $V_{1,H}$ through the modulator, the processor 110 may control the power distribution circuit to allocate the signal $V_{1,H}$ transmission power $(\beta \cdot 2^{m_{1,L}})^2$, thus generating a signal $X_{II}$ corresponding to the user message $u_{1,H}$, where the transmission power $(\beta \cdot 2^{m_{1,L}})^2$ is less than the transmission power $(\beta \cdot 2^{m_1})^2$.

Similarly, after the transceiver 130 modulates the user message $u_{1,L}$ into a signal $V_{1,L}$ through the modulator, the processor 110 may control the power distribution circuit to allocate the signal $V_{1,L}$ transmission power $\beta^2$, thus generating a signal $X_I$ corresponding to the user message $u_{1,L}$, where the transmission power $\beta^2$ is less than the transmission power $(\beta \cdot 2^{m_{1,L}})^2$.

Finally, the transceiver 130 may superpose the signals $X_I$, $X_{II}$, $X_{III}$, and $X_{IV}$ into a superposed signal X, and transmit the superposed signal X to the strong UE and the weak UE. For example, the transceiver 130 may transmit the superposed signal X to the strong UE and the weak UE by broadcasting.

Figure 4:
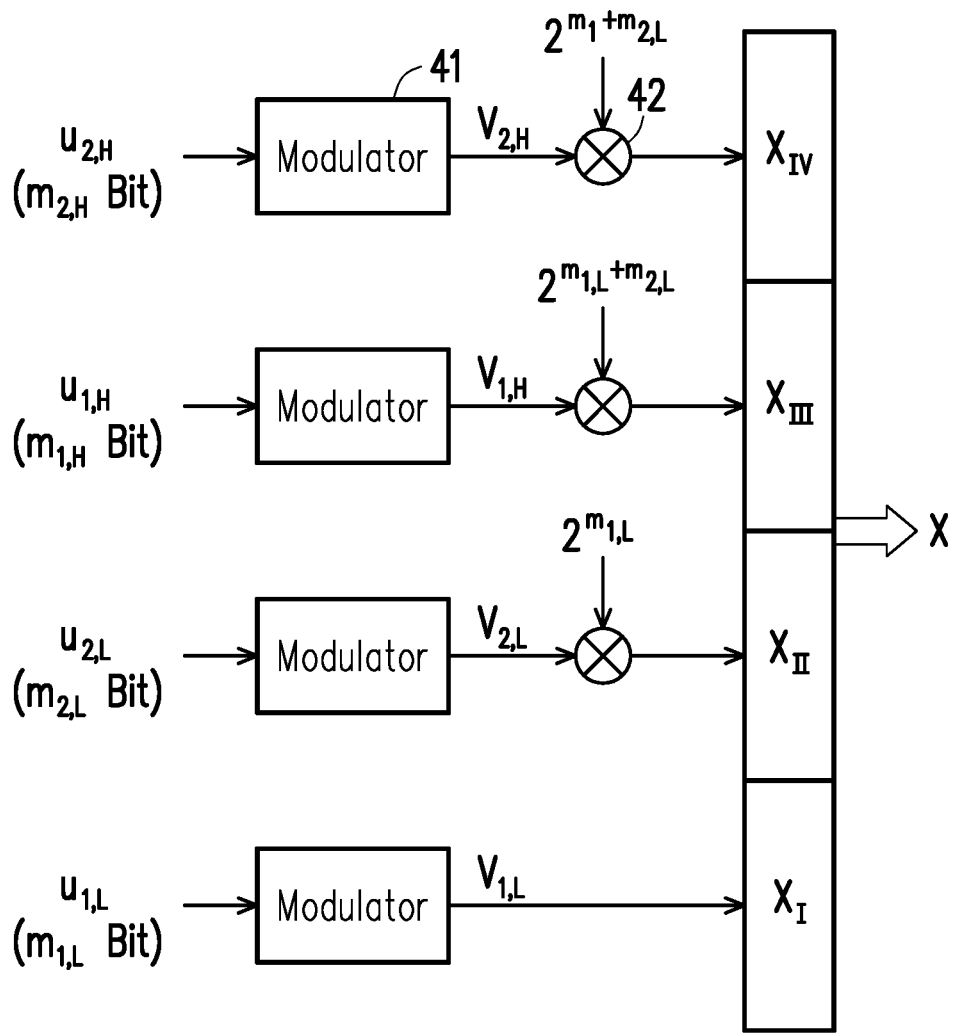
FIG. 4 is a schematic diagram illustrating an LP-based downlink NOMA modulation architecture according to a second embodiment of the invention.

FIG. 4 is a schematic diagram illustrating an LP-based downlink NOMA modulation architecture 40 according to a second embodiment of the invention. The modulation architecture 40 may include a plurality of modulators and a plurality of power distribution circuits, where the plurality of modulators may include a modulator 41 (e.g., a PAM modulator or a QAM modulator), and the plurality of power distribution circuits may include a power distribution circuit 42 (e.g., a multiplier). The modulation architecture 40 may be implemented by the transceiver 130 of the base station 100 as shown in FIG. 2. For example, the transceiver 130 may include the plurality of modulators including the modulator 41 and the plurality of power distribution circuits including the power distribution circuit 42, where the modulator 41 is coupled to the power distribution circuit 42, and the plurality of modulators and the plurality of power distribution circuits may be coupled to the processor 110 respectively.

In the present embodiment, a user message $u_{1,H}$ corresponds to at least one MSB of the strong UE, a user message $u_{1,L}$ corresponds to at least one LSB of the strong UE, $m_1$ ($m_1=m_{1,H}+m_{1,L}$) is the number corresponding to transmission bits of the strong UE, $m_{1,H}$ is the number corresponding to the at least one MSB of the strong UE, $m_{1,L}$ is the number corresponding to the at least one LSB of the strong UE, a user message $u_{2,H}$ corresponds to at least one MSB of the weak UE, a user message $u_{2,L}$ corresponds to at least one LSB of the weak UE, $m_2$ ($m_2=m_{2,H}+m_{2,L}$) is the number corresponding to transmission bits of the weak UE, $m_{2,H}$ is the number corresponding to the at least one MSB of the weak UE, and $m_{2,L}$ is the number corresponding to the at least one LSB of the weak UE.

In an embodiment, the processor 110 may modulate the at least one MSB corresponding to the weak UE to include first transmission power, modulate the at least one LSB corresponding to the weak UE to include second transmission power, and modulate the at least one MSB corresponding to the strong UE to include third transmission power, where the second transmission power is less than the first transmission power, and the third transmission power is between the first transmission power and the second transmission power.

By taking FIG. 4 as an example, after the transceiver 130 modulates the user message $u_{2,H}$ corresponding to the at least one MSB of the weak UE into a modulate signal $V_{2,H}$ through the modulator 41, the processor 110 may determine transmission power corresponding to the user message $u_{2,H}$ according to the number $m_1$ corresponding to the transmission bits of the strong UE and the number $m_{2,L}$ corresponding to the at least one LSB of the weak UE, where the number $m_1$ is a sum of the number $m_{1,H}$ corresponding to the at least one MSB of the strong UE and the number $m_{1,L}$ corresponding to the at least one LSB of the strong UE. Specifically, the processor 110 may control the power distribution circuit 42 to allocate the signal $V_{2,H}$ transmission power $(\beta \cdot 2^{m_1+m_{2,L}})^2$, thus generating a signal $X_{IV}$ corresponding to the user message $u_{2,H}$.

Similarly, after the transceiver 130 modulates the user message $u_{1,H}$ corresponding to the at least one MSB of the strong UE into a signal $V_{1,H}$ through the modulator, the processor 110 may determine transmission power corresponding to the user message $u_{1,H}$ according to the number $m_{1,L}$ corresponding to the at least one LSB of the strong UE and the number $m_{2,L}$ corresponding to the at least one LSB of the weak UE. Specifically, the processor 110 may control the power distribution circuit to allocate the signal $V_{1,H}$ transmission power $(\beta \cdot 2^{m_{1,L}+m_{2,L}})^2$, thus generating a signal $X_{III}$ corresponding to the user message $u_{1,H}$, where the transmission power $(\beta \cdot 2^{m_{1,L}+m_{2,L}})^2$ is less than the transmission power $(\beta \cdot 2^{m_1+m_{2,L}})^2$.

Similarly, after the transceiver 130 modulates the user message $u_{2,L}$ corresponding to the least one LSB of the weak UE into a signal $V_{2,L}$ through the modulator, the processor 110 may determine transmission power corresponding to the user message $u_{2,L}$ according to the number $m_{1,L}$ corresponding to the at least one LSB of the strong UE. Specifically, the processor 110 may control the power distribution circuit to allocate the signal $V_{2,L}$ transmission power $(\beta \cdot 2^{m_{1,L}})^2$, thus generating a signal $X_{II}$ corresponding to the user message $u_{2,L}$, where the transmission power $(\beta \cdot 2^{m_{1,L}})^2$ is less than the transmission power $(\beta \cdot 2^{m_{1,L}+m_{2,L}})^2$.

Similarly, after the transceiver 130 modulates the user message $u_{1,L}$ corresponding to the at least one LSB of the strong UE into a signal $V_{1,L}$ through the modulator, the processor 110 may control the power distribution circuit to allocate the signal $V_{1,L}$ transmission power $\beta^2$, thus generating a signal $X_I$ corresponding to the user message $u_{1,L}$, where the transmission power $\beta^2$ is less than the transmission power $(\beta \cdot 2^{m_{1,L}})^2$.

Finally, the transceiver 130 may superpose the signals $X_I$, $X_{II}$, $X_{III}$, and $X_{IV}$ into a superposed signal X, and transmit the superposed signal X to the strong UE and the weak UE. For example, the transceiver 130 may transmit the superposed signal X to the strong UE and the weak UE by broadcasting. By improving the power of the at least one MSB of the strong UE, the capacity of the NOMA system using the modulation architecture 40 can be better than that of the NOMA system using the modulation architecture 30.

Figure 5:
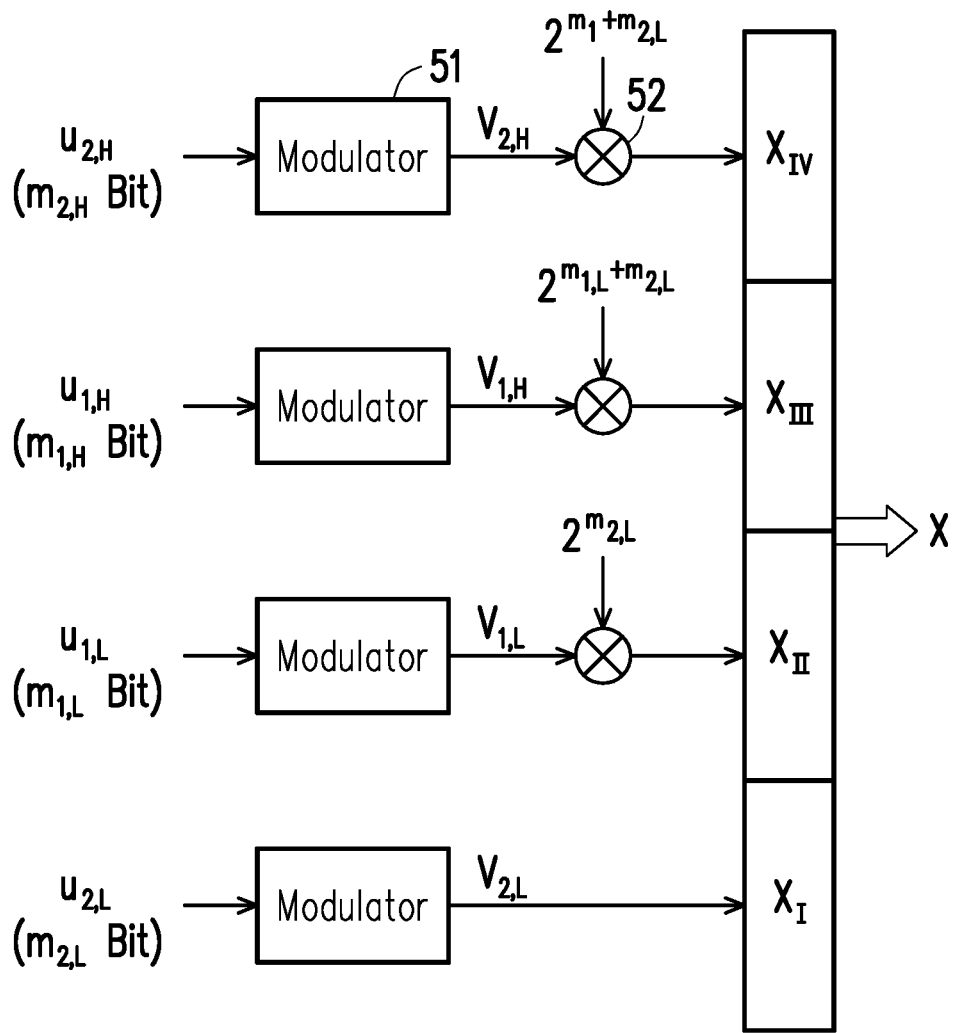
FIG. 5 is a schematic diagram illustrating an LP-based downlink NOMA modulation architecture according to a third embodiment of the invention.

FIG. 5 is a schematic diagram illustrating an LP-based downlink NOMA modulation architecture 50 according to a third embodiment of the invention. The modulation architecture 50 may include a plurality of modulators and a plurality of power distribution circuits, where the plurality of modulators may include a modulator 51 (e.g., but not limited to, a PAM modulator or a QAM modulator), and the plurality of power distribution circuits may include a power distribution circuit 52 (e.g., a multiplier). The modulation architecture 50 may be implemented by the transceiver 130 of the base station 100 as shown in FIG. 2. For example, the transceiver 130 may include the plurality of modulators including the modulator 51 and the plurality of power distribution circuits including the power distribution circuit 52, where the modulator 51 is coupled to the power distribution circuit 52, and the plurality of modulators and the plurality of power distribution circuits may be coupled to the processor 110 respectively.

In the present embodiment, a user message $u_{1,H}$ corresponds to at least one MSB of the strong UE, a user message $u_{1,L}$ corresponds to at least one LSB of the strong UE, $m_1$ ($m_1=m_{1,H}+m_{1,L}$) is the number corresponding to transmission bits of the strong UE, $m_{1,H}$ is the number corresponding to the at least one MSB of the strong UE, $m_{1,L}$ is the number corresponding to the at least one LSB of the strong UE, a user message $u_{2,H}$ corresponds to at least one MSB of the weak UE, a user message $u_{2,L}$ corresponds to at least one LSB of the weak UE, $m_2$ ($m_2=m_{2,H}+m_{2,L}$) is the number corresponding to transmission bits of the weak UE, $m_{2,H}$ is the number corresponding to the at least one MSB of the weak UE, and $m_{2,L}$ is the number corresponding to the at least one LSB of the weak UE.

In the present embodiment, after the transceiver 130 modulates the user message $u_{2,H}$ corresponding to the at least one MSB of the weak UE into a signal $V_{2,H}$ through the modulator 51, the processor 110 may determine transmission power corresponding to the user message $u_{2,H}$ according to the number $m_1$ corresponding to the transmission bits of the strong UE and the number $m_{2,L}$ corresponding to the at least one LSB of the weak UE, where the number $m_1$ is a sum of the number $m_{1,H}$ corresponding to the at least one MSB of the strong UE and the number $m_{1,L}$ corresponding to the at least one LSB of the strong UE. Specifically, the processor 110 may control the power distribution circuit 52 to allocate the signal $V_{2,H}$ transmission power $(\beta \cdot 2^{m_1+m_{2,L}})^2$, thus generating a signal $X_{IV}$ corresponding to the user message $u_{2,H}$.

Similarly, after the transceiver 130 modulates the user message $u_{1,H}$ corresponding to the at least one MSB of the strong UE into a signal $V_{1,H}$ through the modulator, the processor 110 may determine transmission power corresponding to the user message $u_{1,H}$ according to the number $m_{1,L}$ corresponding to the at least one LSB of the strong UE and the number $m_{2,L}$ corresponding to the at least one LSB of the weak UE. Specifically, the processor 110 may control the power distribution circuit to allocate the signal $V_{1,H}$ transmission power $(\beta \cdot 2^{m_{1,L}+m_{2,L}})^2$, thus generating a signal $X_{III}$ corresponding to the user message $u_{1,H}$, where the transmission power $(\beta \cdot 2^{m_{1,L}+m_{2,L}})^2$ is less than the transmission power $(\beta \cdot 2^{m_1+m_{2,L}})^2$.

Similarly, after the transceiver 130 modulates the user message $u_{1,L}$ corresponding to the at least one LSB of the strong UE into a signal $V_{1,L}$ through the modulator, the processor 110 may determine transmission power corresponding to the user message $u_{1,L}$ according to the number $m_{2,L}$ corresponding to the at least one LSB of the weak UE. Specifically, the processor 110 may control the power distribution circuit to allocate the signal $V_{1,L}$ transmission power $(\beta \cdot 2^{m_{2,L}})^2$, thus generating a signal $X_{II}$ corresponding to the user message $u_{1,L}$, where the transmission power $(\beta \cdot 2^{m_{2,L}})^2$ is less than the transmission power $(\beta \cdot 2^{m_{1,L}+m_{2,L}})^2$.

Similarly, after the transceiver 130 modulates the user message $u_{2,L}$ corresponding to the at least one LSB of the weak UE into a signal $V_{2,L}$ through the modulator, the processor 110 may control the power distribution circuit to allocate the signal $V_{2,L}$ transmission power $\beta^2$, thus generating a signal $X_I$ corresponding to the user message $u_{2,L}$, where the transmission power $\beta^2$ is less than the transmission power $(\beta \cdot 2^{m_{2,L}})^2$.

Finally, the transceiver 130 may superpose the signals $X_I$, $X_{II}$, $X_{III}$, and $X_{IV}$, into a superposed signal X, and transmit the superposed signal X to the strong UE and the weak UE. For example, the transceiver 130 may transmit the superposed signal X to the strong UE and the weak UE by broadcasting. By improving the power of the at least one LSB of the strong UE, the capacity of the NOMA system using the modulation architecture 50 can be better than that of the NOMA system using the modulation architecture 40.

Figure 6:
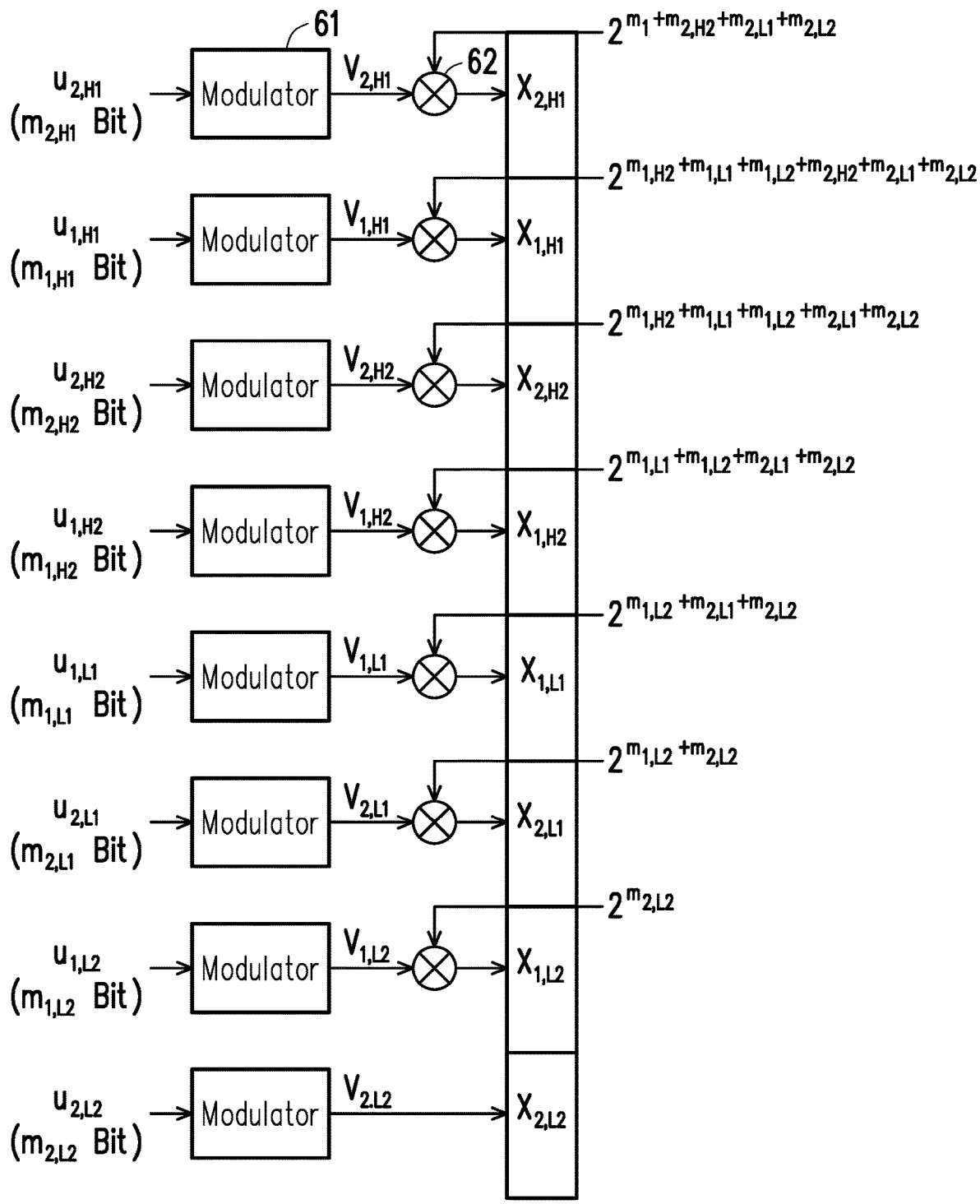
FIG. 6 is a schematic diagram illustrating an LP-based downlink NOMA modulation architecture according to a fourth embodiment of the invention.

FIG. 6 is a schematic diagram illustrating an LP-based downlink NOMA modulation architecture 60 according to a fourth embodiment of the invention. The modulation architecture 60 may include a plurality of modulators and a plurality of power distribution circuits, where the plurality of modulators may include a modulator 61 (e.g., but not limited to, a PAM modulator or a QAM modulator), and the plurality of power distribution circuits may include a power distribution circuit 62 (e.g., a multiplier). The modulation architecture 60 may be implemented by the transceiver 130 of the base station 100 as shown in FIG. 2. For example, the transceiver 130 may include the plurality of modulators including the modulator 61 and the plurality of power distribution circuits including the power distribution circuit 62, where the modulator 61 is coupled to the power distribution circuit 62, and the plurality of modulators and the plurality of power distribution circuits may be coupled to the processor 110 respectively.

In the present embodiment, a user message $u_{1,H1}$ corresponds to at least one MSB of the strong UE, a user message $u_{1,H2}$ corresponds to at least one next MSB of the strong UE, a user message $u_{1,L2}$ corresponds to at least one LSB of the strong UE, a user message $u_{1,L1}$ corresponds to at least one next LSB of the strong UE, a user message $u_{2,H1}$ corresponds to at least one MSB of the weak UE, a user message $u_{2,H2}$ corresponds to at least one next MSB of the weak UE, a user message $u_{2,L2}$ corresponds to at least one LSB of the weak UE, a user message $u_{2,L1}$ corresponds to at least one next LSB of the weak UE, $m_1$ ($m_1=m_{1,H1}+m_{1,H2}+m_{1,L1}+m_{1,L2}$) is the number corresponding to transmission bits of the strong UE, $m_{1,H1}$ corresponds to the number of the at least one MSB of the strong UE, $m_{1,H2}$ corresponds to the number of the at least one next MSB of the strong UE, $m_{1,L2}$ corresponds to the number of the at least one LSB of the strong UE, $m_{1,L1}$ corresponds to the number of the at least one next LSB of the strong UE, $m_{2,H1}$ corresponds to the number of the at least one MSB of the weak UE, $m_{2,H2}$ corresponds to the number of the at least one next MSB of the weak UE, $m_{2,L2}$ corresponds to the number of the at least one LSB of the weak UE, and $m_{2,L1}$ corresponds to the number of the at least one next LSB of the weak UE.

In the present embodiment, after the transceiver 130 modulates the user message $u_{2,H1}$ corresponding to the at least one MSB of the weak UE into a signal $V_{2,H1}$ through the modulator 61, the processor 110 may determine transmission power corresponding to the user message $u_{2,H1}$ according to the number $m_1$ corresponding to the transmission bits of the strong UE, the number $m_{2,H2}$ corresponding to the at least one next MSB of the weak UE, the number $m_{2,L1}$ corresponding to the at least one LSB of the weak UE, and the number $m_{2,L2}$ corresponding to the at least one next LSB of the weak UE, where the number $m_1$ is a sum of the number $m_{1,H1}$ corresponding to the at least one MSB of the strong UE, the number $m_{1,H2}$ corresponding to the at least one next MSB of the strong UE, the number $m_{1,L1}$ corresponding to the at least one LSB of the strong UE, and the number $m_{1,L2}$ corresponding to the at least one next LSB of the strong UE. Specifically, the processor 110 may control the power distribution circuit 62 to allocate the signal $V_{2,H1}$ transmission power $(\beta \cdot 2^{m_1+m_{2,H2}+m_{2,L1}+m_{2,L2}})^2$, thus generating a signal $X_{2,H1}$ corresponding to the user message $u_{2,H1}$.

Similarly, after the transceiver 130 modulates the user message $u_{1,H1}$ corresponding to the at least one MSB of the strong UE into a signal $V_{1,H1}$ through the modulator, the processor 110 may determine transmission power corresponding to the user message $u_{1,H1}$ according to the number $m_{1,H2}$ corresponding to the at least one next MSB of the strong UE, the number $m_{1,L1}$ corresponding to the at least one LSB of the strong UE, the number $m_{1,L2}$ corresponding to the at least one next LSB of the strong UE, the number $m_{2,H2}$ corresponding to the at least one next MSB of the weak UE, the number $m_{2,L1}$ corresponding to the at least one LSB of the weak UE, and the number $m_{2,L2}$ corresponding to the at least one next LSB of the weak UE. Specifically, the processor 110 may control the power distribution circuit to allocate the signal $V_{1,H1}$ transmission power $(\beta \cdot 2^{m_{1,H2}+m_{1,L1}+m_{1,L2}+m_{2,H2}+m_{2,L1}+m_{2,L2}})^2$, thus generating a signal $X_{1,H1}$ corresponding to the user message $u_{1,H1}$, where the transmission power $(\beta \cdot 2^{m_{1,H2}+m_{1,L1}+m_{1,L2}+m_{2,H2}+m_{2,L1}+m_{2,L2}})^2$ is less than the transmission power $(\beta \cdot 2^{m_1+m_{2,H2}+m_{2,L1}+m_{2,L2}})^2$.

Similarly, after the transceiver 130 modulates the user message $u_{2,H2}$ corresponding to the at least one next MSB of the weak UE into a signal $V_{2,H2}$ through the modulator, the processor 110 may determine transmission power corresponding to the user message $u_{2,H2}$ according to the number $m_{1,H2}$ corresponding to the at least one next MSB of the strong UE, the number $m_{1,L1}$ corresponding to the at least one LSB of the strong UE, the number $m_{1,L2}$ corresponding to the at least one next LSB of the strong UE, the number $m_{2,L1}$ corresponding to the at least one LSB of the weak UE, and the number $m_{2,L2}$ corresponding to the at least one next LSB of the weak UE. Specifically, the processor 110 may control the power distribution circuit to allocate the signal $V_{2,H2}$ transmission power $(\beta \cdot 2^{m_{1,H2}+m_{1,L1}+m_{1,L2}+m_{2,L1}+m_{2,L2}})^2$, thus generating a signal $X_{2,H2}$ corresponding to the user message $u_{2,H2}$, where the transmission power $(\beta \cdot 2^{m_{1,H2}+m_{1,L1}+m_{1,L2}+m_{2,L1}+m_{2,L2}})^2$ is less than the transmission power $(\beta \cdot 2^{m_{1,H2}+m_{1,L1}+m_{1,L2}+m_{2,H2}+m_{2,L1}+m_{2,L2}})^2$.

Similarly, after the transceiver 130 modulates the user message $u_{1,H2}$ corresponding to the at least one next MSB of the strong UE into a signal $V_{1,H2}$ through the modulator, the processor 110 may determine transmission power corresponding to the user message $u_{1,H2}$ according to the number $m_{1,L1}$ corresponding to the at least one LSB of the strong UE, the number $m_{1,L2}$ corresponding to the at least one next LSB of the strong UE, the number $m_{2,L1}$ corresponding to the at least one LSB of the weak UE, and the number $m_{2,L2}$ corresponding to the at least one next LSB of the weak UE. Specifically, the processor 110 may control the power distribution circuit to allocate the signal $V_{1,H2}$ transmission power $(\beta \cdot 2^{m_{1,L1}+m_{1,L2}+m_{2,L1}+m_{2,L2}})^2$, thus generating a signal $X_{1,H2}$ corresponding to the user message $u_{1,H2}$, where the transmission power $(\beta \cdot 2^{m_{1,L1}+m_{1,L2}+m_{2,L1}+m_{2,L2}})^2$ is less than the transmission power $(\beta \cdot 2^{m_{1,H2}+m_{1,L1}+m_{1,L2}+m_{2,L1}+m_{2,L2}})^2$.

Similarly, after the transceiver 130 modulates the user message $u_{1,L1}$ corresponding to the at least one LSB of the strong UE into a signal $V_{1,L1}$ through the modulator, the processor 110 may determine transmission power corresponding to the user message $u_{1,L1}$ according to the number $m_{1,L2}$ corresponding to the at least one next LSB of the strong UE, the number $m_{2,L1}$ corresponding to the at least one LSB of the weak UE, and the number $m_{2,L2}$ corresponding to the at least one next LSB of the weak UE. Specifically, the processor 110 may control the power distribution circuit to allocate the signal $V_{1,L1}$ transmission power $(\beta \cdot 2^{m_{1,L2}+m_{2,L1}+m_{2,L2}})^2$, thus generating a signal $X_{1,L1}$ corresponding to the user message $u_{1,L1}$, where the transmission power $(\beta \cdot 2^{m_{1,L2}+m_{2,L1}+m_{2,L2}})^2$ is less than the transmission power $(\beta \cdot 2^{m_{1,L1}+m_{1,L2}+m_{2,L1}+m_{2,L2}})^2$.

Similarly, after the transceiver 130 modulates the user message $u_{2,L1}$ corresponding to the at least one LSB of the weak UE into a signal $V_{2,L1}$ through the modulator, the processor 110 may determine transmission power corresponding to the user message $u_{2,L1}$ according to the number $m_{1,L2}$ corresponding to the at least one next LSB of the strong UE and the number $m_{2,L2}$ corresponding to the at least one next LSB of the weak UE. Specifically, the processor 110 may control the power distribution circuit to allocate the signal $V_{2,L1}$ transmission power $(\beta \cdot 2^{m_{1,L2}+m_{2,L2}})^2$, thus generating a signal $X_{2,L1}$ corresponding to the user message $u_{2,L1}$, where the transmission power $(\beta \cdot 2^{m_{1,L2}+m_{2,L2}})^2$ is less than the transmission power $(\beta \cdot 2^{m_{1,L2}+m_{2,L1}+m_{2,L2}})^2$.

Similarly, after the transceiver 130 modulates the user message $u_{1,L2}$ corresponding to the at least one next LSB of the strong UE into a signal $V_{1,L2}$ through the modulator, the processor 110 may determine transmission power corresponding to the user message $u_{1,L2}$ according to the number $m_{2,L2}$ corresponding to the at least one next LSB of the weak UE. Specifically, the processor 110 may control the power distribution circuit to allocate the signal $V_{1,L2}$ transmission power $(\beta \cdot 2^{m_{2,L2}})^2$, thus generating a signal $X_{1,L2}$ corresponding to the user message $u_{1,L2}$, where the transmission power $(\beta \cdot 2^{m_{2,L2}})^2$ is less than the transmission power $(\beta \cdot 2^{m_{1,L2}+m_{2,L2}})^2$.

Similarly, after the transceiver 130 modulates the user message $u_{2,L2}$ corresponding to the at least one next LSB of the weak UE into a signal $V_{2,L2}$ through the modulator, the processor 110 may control the power distribution circuit to allocate the signal $V_{2,L2}$ transmission power $\beta^2$, thus generating a signal $X_{2,L2}$ corresponding to the user message $u_{2,L2}$, where the transmission power $\beta^2$ is less than the transmission power $(\beta \cdot 2^{m_{2,L2}})^2$.

Finally, the transceiver 130 may superpose the signals $X_{2,H1}$, $X_{1,H1}$, $X_{2,H2}$, $X_{1,H2}$, $X_{1,L1}$, $X_{2,L1}$, $X_{1,L2}$, and $X_{2,L2}$ into a superposed signal X, and transmit the superposed signal X to the strong UE and the weak UE. For example, the transceiver 130 may transmit the superposed signal X to the strong UE and the weak UE by broadcasting.

Figure 7:
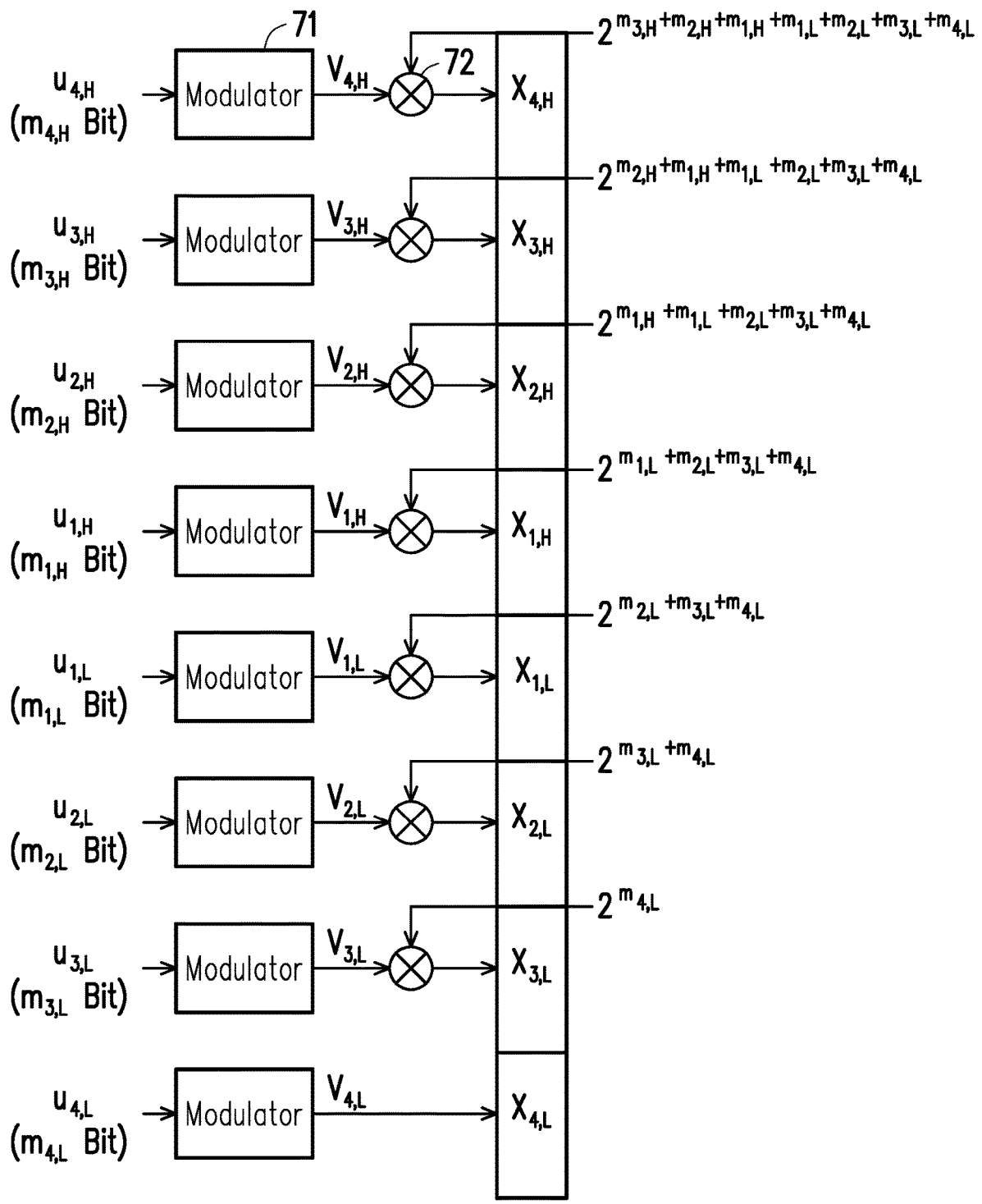
FIG. 7 is a schematic diagram illustrating an LP-based downlink NOMA modulation architecture according to a fifth embodiment of the invention.

FIG. 7 is a schematic diagram illustrating an LP-based downlink NOMA modulation architecture 70 according to a fifth embodiment of the invention. The modulation architecture 70 may include a plurality of modulators and a plurality of power distribution circuits, where the plurality of modulators may include a modulator 71 (e.g., but not limited to, a PAM modulator or a QAM modulator), and the plurality of power distribution circuits may include a power distribution circuit 72 (e.g., a multiplier). The modulation architecture 70 may be implemented by the transceiver 130 of the base station 100 as shown in FIG. 2. For example, the transceiver 130 may include the plurality of modulators including the modulator 71 and the plurality of power distribution circuits including the power distribution circuit 72, where the modulator 71 is coupled to the power distribution circuit 72, and the plurality of modulators and the plurality of power distribution circuits may be coupled to the processor 110 respectively.

In the present embodiment, a user message $u_{1,H}$ corresponds to at least one MSB of first UE, a user message $u_{1,L}$ corresponds to at least one LSB of the first UE, a user message $u_{2,H}$ corresponds to at least one MSB of second UE, a user message $u_{2,L}$ corresponds to at least one LSB of the second UE, a user message $u_{3,H}$ corresponds to at least one MSB of third UE, a user message $u_{3,L}$ corresponds to at least one LSB of the third UE, a user message $u_{4,H}$ corresponds to at least one MSB of fourth UE, a user message $u_{4,L}$ corresponds to at least one LSB of the fourth UE, $m_{1,H}$ corresponds to the number of the at least one MSB of the first UE, $m_{1,L}$ corresponds to the number of the at least one LSB of the first UE, $m_{2,H}$ corresponds to the number of the at least one MSB of the second UE, $m_{2,L}$ corresponds to the number of the at least one LSB of the second UE, $m_{3,H}$ corresponds to the number of the at least one MSB of the third UE, $m_{3,L}$ corresponds to the number of the at least one LSB of the third UE, $m_{4,H}$ corresponds to the number of the at least one MSB of the fourth UE, and $m_{4,L}$ corresponds to the number of the at least one LSB of the fourth UE, where a channel gain of the first UE is greater than that of the second UE, the channel gain of the second UE is greater than that of the third UE, and the channel gain of the third UE is greater than that of the fourth UE.

In the present embodiment, after the transceiver 130 modulates the user message $u_{4,H}$ corresponding to the at least one MSB of the fourth UE into a signal $V_{4,H}$ through the modulator 71, the processor 110 may determine transmission power corresponding to the user message $u_{4,H}$ according to the number $m_{3,H}$ corresponding to the at least one MSB of the third UE, the number $m_{2,H}$ corresponding to the at least one MSB of the second UE, the number $m_{1,H}$ corresponding to the at least one MSB of the first UE, the number $m_{1,L}$ corresponding to the at least one LSB of the first UE, the number $m_{2,L}$ corresponding to the at least one LSB of the second UE, the number $m_{3,L}$ corresponding to the at least one LSB of the third UE, and the number $m_{4,L}$ corresponding to the at least one LSB of the fourth UE. Specifically, the processor 110 may control the power distribution circuit 72 to allocate the signal $V_{4,H}$ transmission power $(\beta \cdot 2^{m_{3,H}+m_{2,H}+m_{1,H}+m_{1,L}+m_{2,L}+m_{3,L},m_{4,L}})^2$, thus generating a signal $X_{4,H}$ corresponding to the user message $u_{4,H}$.

Similarly, after the transceiver 130 modulates the user message $u_{3,H}$ corresponding to the at least one MSB of the third UE into a signal $V_{3,H}$ through the modulator, the processor 110 may determine transmission power corresponding to the user message $u_{3,H}$ according to the number $m_{2,H}$ corresponding to the at least one MSB of the second UE, the number $m_{1,H}$ corresponding to the at least one MSB of the first UE, the number $m_{1,L}$ corresponding to the at least one LSB of the first UE, the number $m_{2,L}$ corresponding to the at least one LSB of the second UE, the number $m_{3,L}$ corresponding to the at least one LSB of the third UE, and the number $m_{4,L}$ corresponding to the at least one LSB of the fourth UE. Specifically, the processor 110 may control the power distribution circuit to allocate the signal $V_{3,H}$ transmission power $(\beta \cdot 2^{m_{2,H}+m_{1,H}+m_{1,L}+m_{2,L}+m_{3,L}+m_{4,L}})^2$ thus generating a signal $X_{3,H}$ corresponding to the user message $u_{3,H}$, where the transmission power $(\beta \cdot 2^{m_{2,H}+m_{1,H}+m_{1,L}+m_{2,L}+m_{3,L}+m_{4,L}})^2$ is less than the transmission power $(\beta \cdot 2^{m_{3,H}+m_{2,H}+m_{1,H}+m_{1,L}+m_{2,L}+m_{3,L}+m_{4,L}})^2$.

Similarly, after the transceiver 130 modulates the user message $u_{2,H}$ corresponding to the at least one MSB of the second UE into a signal $V_{2,H}$ through the modulator, the processor 110 may determine transmission power corresponding to the user message $u_{2,H}$ according to the number $m_{1,H}$ corresponding to the at least one MSB of the first UE, the number $m_{1,L}$ corresponding to the at least one LSB of the first UE, the number $m_{2,L}$ corresponding to the at least one LSB of the second UE, the number $m_{3,L}$ corresponding to the at least one LSB of the third UE, and the number $m_{4,L}$ corresponding to the at least one LSB of the fourth UE. Specifically, the processor 110 may control the power distribution circuit to allocate the signal $V_{2,H}$ transmission power $(\beta \cdot 2^{m_{1,H}+m_{1,L}+m_{2,L}+m_{3,L}+m_{4,L}})^2$, thus generating a signal $X_{2,H}$ corresponding to the user message $u_{2,H}$, where the transmission power $(\beta \cdot 2^{m_{1,H}+m_{1,L}+m_{2,L}+m_{3,L}+m_{4,L}})^2$ is less than the transmission power $(\beta \cdot 2^{m_{2,H}+m_{1,H}+m_{1,L}+m_{2,L}+m_{3,L}+m_{4,L}})^2$.

Similarly, after the transceiver 130 modulates the user message $u_{1,H}$ corresponding to the at least one MSB of the first UE into a signal $V_{1,H}$ through the modulator, the processor 110 may determine transmission power corresponding to the user message $u_{1,H}$ according to the number $m_{1,L}$ corresponding to the at least one LSB of the first UE, the number $m_{2,L}$ corresponding to the at least one LSB of the second UE, the number $m_{3,L}$ corresponding to the at least one LSB of the third UE, and the number $m_{4,L}$ corresponding to the at least one LSB of the fourth UE. Specifically, the processor 110 may control the power distribution circuit to allocate the signal $V_{1,H}$ transmission power $(\beta \cdot 2^{m_{1,L}+m_{2,L}+m_{3,L}+m_{4,L}})^2$, thus generating a signal $X_{1,H}$ corresponding to the user message $u_{1,H}$, where the transmission power $(\beta \cdot 2^{m_{1,L}+m_{2,L}+m_{3,L}+m_{4,L}})^2$ is less than the transmission power $(\beta \cdot 2^{m_{1,H}+m_{1,L}+m_{2,L}+m_{3,L}+m_{4,L}})^2$.

Similarly, after the transceiver 130 modulates the user message $u_{1,L}$ corresponding to the at least one LSB of the first UE into a signal $V_{1,L}$ through the modulator, the processor 110 may determine transmission power corresponding to the user message $u_{1,L}$ according to the number $m_{2,L}$ corresponding to the at least one LSB of the second UE, the number $m_{3,L}$ corresponding to the at least one LSB of the third UE, and the number $m_{4,L}$ corresponding to the at least one LSB of the fourth UE. Specifically, the processor 110 may control the power distribution circuit to allocate the signal $V_{1,L}$ transmission power $(\beta \cdot 2^{m_{2,L}+m_{3,L}+m_{4,L}})^2$, thus generating a signal $X_{1,L}$ corresponding to the user message $u_{1,L}$, where the transmission power $(\beta \cdot 2^{m_{2,L}+m_{3,L}+m_{4,L}})^2$ is less than the transmission power $(\beta \cdot 2^{m_{1,L}+m_{2,L}+m_{3,L}+m_{4,L}})^2$.

Similarly, after the transceiver 130 modulates the user message $u_{2,L}$ corresponding to the at least one LSB of the second UE into a signal $V_{2,L}$ through the modulator, the processor 110 may determine transmission power corresponding to the user message $u_{2,L}$ according to the number $m_{3,L}$ corresponding to the at least one LSB of the third UE and the number $m_{4,L}$ corresponding to the at least one LSB of the fourth UE. Specifically, the processor 110 may control the power distribution circuit to allocate the signal $V_{2,L}$ transmission power $(\beta \cdot 2^{m_{3,L}+m_{4,L}})^2$, thus generating a signal $X_{2,L}$ corresponding to the user message $u_{2,L}$, where the transmission power $(\beta \cdot 2^{m_{3,L}+m_{4,L}})^2$ is less than the transmission power $(\beta \cdot 2^{m_{2,L}+m_{3,L}+m_{4,L}})^2$.

Similarly, after the transceiver 130 modulates the user message $u_{3,L}$ corresponding to the at least one LSB of the third UE into a signal $V_{3,L}$ through the modulator, the processor 110 may determine transmission power corresponding to the user message $u_{3,L}$ according to the number $m_{4,L}$ corresponding to the at least one LSB of the fourth UE. Specifically, the processor 110 may control the power distribution circuit to allocate the signal $V_{3,L}$ transmission power $(\beta \cdot 2^{m_{4,L}})^2$, thus generating a signal $X_{3,L}$ corresponding to the user message $u_{3,L}$, where the transmission power $(\beta \cdot 2^{m_{4,L}})^2$ is less than the transmission power $(\beta \cdot 2^{m_{3,L}+m_{4,L}})^2$.

Similarly, after the transceiver 130 modulates the user message $u_{4,L}$ corresponding to the at least one LSB of the fourth UE into a signal $V_{4,L}$ through the modulator, the processor 110 may control the power distribution circuit to allocate the signal $V_{4,L}$ transmission power $\beta^2$, thus generating a signal $X_{4,L}$ corresponding to the user message $u_{4,L}$, where the transmission power $\beta^2$ is less than the transmission power $(\beta \cdot 2^{m_{4,L}})^2$.

Finally, the transceiver 130 may superpose the signals $X_{4,H}$, $X_{3,H}$, $X_{2,H}$, $X_{1,H}$, $X_{1,L}$, $X_{2,L}$, $X_{3,L}$, and $X_{4,L}$ into a superposed signal X, and transmit the superposed signal X to the first UE, the second UE, the third UE, and the fourth UE. For example, the transceiver 130 may transmit the superposed signal X to the first UE, the second UE, the third UE, and the fourth UE by broadcasting.

Figure 8:
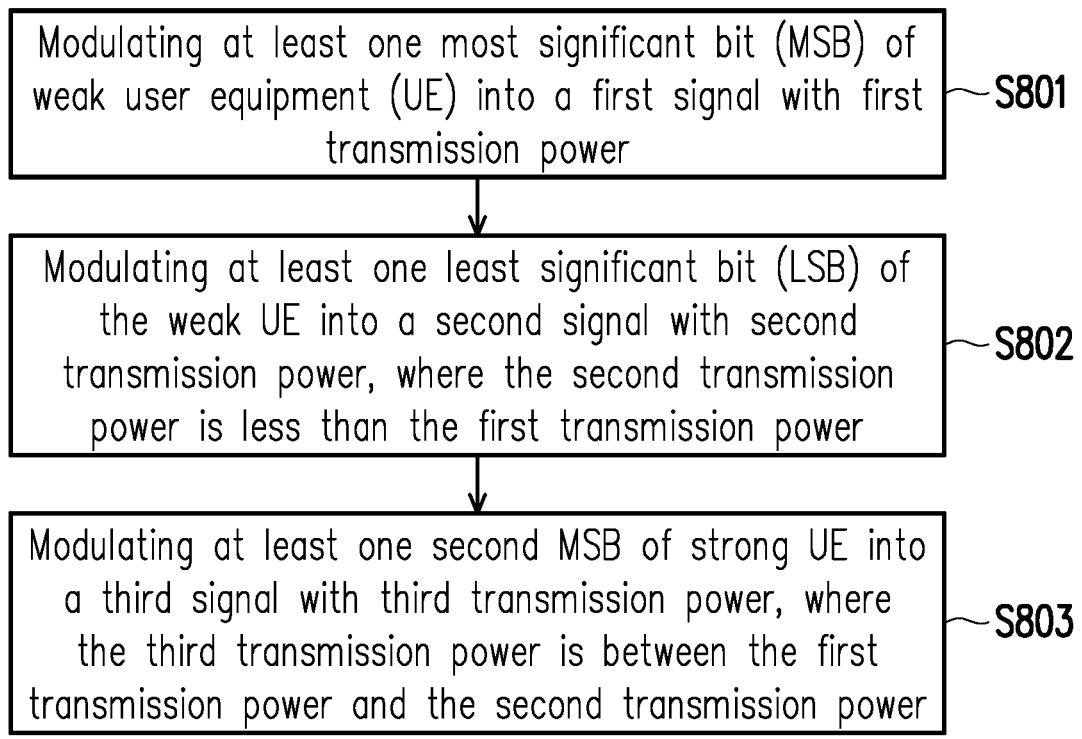
FIG. 8 is a flow chart illustrating an LP-based downlink NOMA modulation method according to an embodiment of the invention.

FIG. 8 is a flow chart illustrating an LP-based downlink NOMA modulation method according to an embodiment of the invention, where the modulation method may be implemented by the base station 110 as shown in FIG. 2. In step S801, at least one MSB of weak UE is modulated into a first signal with first transmission power. In step S802, at least one LSB of the weak UE is modulated into a second signal with second transmission power, where the second transmission power is less than the first transmission power. In step S803, at least one second MSB of strong UE is modulated into a third signal with third transmission power, where the third transmission power is between the first transmission power and the second transmission power.

Based on the above, the base station and the modulation method supporting LP-based downlink NOMA provided by the invention may be used to increase the sum capacity of the LP-based NOMA system. The base station may adjust the transmission power of the at least one MSB of the strong UE to be between the transmission power of the at least one MSB and the transmission power of the at least one LSB of the weak UE through power distribution. The base station may also perform power distribution according to the number of the at least one MSB or the number of the at least one LSB of the strong UE or the weak UE. The base station of the invention may further distribute transmission power to the plurality of bits of the strong UE and the plurality of bits of the weak UE, so that all the bits of the strong UE obtain a higher sum of transmission power than all the bits of the weak UE. In this way, a greater sum capacity compared to that of a conventional LP-based NOMA system is provided.

What is claimed is:

1. A base station supporting lattice-partition-based downlink non-orthogonal multiple access, configured to communicate with strong user equipment and weak user equipment, wherein the base station comprises:
 a transceiver; and
 a processor coupled to the transceiver, wherein the processor is configured to perform:
  modulating at least one most significant bit of the weak user equipment into a first signal with first transmission power;
  modulating at least one least significant bit of the weak user equipment into a second signal with second transmission power, wherein the second transmission power is less than the first transmission power; and
  modulating at least one second most significant bit of the strong user equipment into a third signal with third transmission power, wherein the third transmission power is between the first transmission power and the second transmission power.

2. The base station according to claim 1, wherein the processor is further configured to perform:
 determining the third transmission power according to a number of the at least one least significant bit.

3. The base station according to claim 1, wherein the processor is further configured to perform:
 determining the first transmission power according to a number of the at least one second most significant bit.

4. The base station according to claim 1, wherein the processor is further configured to perform:
 modulating at least one second least significant bit of the strong user equipment into a fourth signal with fourth transmission power, wherein the fourth transmission power is less than the third transmission power.

5. The base station according to claim 4, wherein the fourth transmission power is less than the second transmission power.

6. The base station according to claim 5, wherein the processor is further configured to perform:
 determining the second transmission power according to a number of the at least one second least significant bit.

7. The base station according to claim 4, wherein the fourth transmission power is greater than the second transmission power.

8. The base station according to claim 7, wherein the processor is further configured to perform:
 determining the fourth transmission power according to a number of the at least one least significant bit.

9. A modulation method for communicating with strong user equipment and weak user equipment, applied to a base station supporting lattice-partition-based downlink non-orthogonal multiple access, wherein the modulation method comprises:
 modulating at least one most significant bit of the weak user equipment into a first signal with first transmission power;
 modulating at least one least significant bit of the weak user equipment into a second signal with second transmission power, wherein the second transmission power is less than the first transmission power; and
 modulating at least one second most significant bit of the strong user equipment into a third signal with third transmission power, wherein the third transmission power is between the first transmission power and the second transmission power.

10. The modulation method according to claim 9, wherein the step of modulating the at least one second most significant bit of the strong user equipment into the third signal with the third transmission power comprises:
 determining the third transmission power according to a number of the at least one least significant bit.

11. The modulation method according to claim 9, wherein the step of modulating the at least one most significant bit of the weak user equipment into the first signal with the first transmission power comprises:
 determining the first transmission power according to a number of the at least one second most significant bit.

12. The modulation method according to claim 9, further comprising:
 modulating at least one second least significant bit of the strong user equipment into a fourth signal with fourth transmission power, wherein the fourth transmission power is less than the third transmission power.

13. The modulation method according to claim 12, wherein the fourth transmission power is less than the second transmission power.

14. The modulation method according to claim 13, wherein the step of modulating the at least one least significant bit of the weak user equipment into the second signal with the second transmission power comprises:
 determining the second transmission power according to a number of the at least one second least significant bit.

15. The modulation method according to claim 12, wherein the fourth transmission power is greater than the second transmission power.

16. The modulation method according to claim 15, wherein the step of modulating the at least one second least significant bit of the strong user equipment into the fourth signal with the fourth transmission power comprises:
 determining the fourth transmission power according to a number of the at least one least significant bit.

* * * * *